United States Patent
Winterbottom et al.

[11] 3,770,511
[45] Nov. 6, 1973

[54] STORAGE BATTERY HAVING INTEGRAL CABLES EXTENDING THE BATTERY'S TERMINALS

[75] Inventors: David A. Winterbottom; Ellis G. Wheadon, both of Anderson; Philip E. Higdon, Munci, all of Ind.

[73] Assignee: General Motors Corporation, Detroit, Mich.

[22] Filed: Apr. 25, 1972

[21] Appl. No.: 247,352

[52] U.S. Cl. ............ 136/135 S, 136/166, 136/181
[51] Int. Cl. ............................................ H01m 5/00
[58] Field of Search.................. 136/181, 170, 166, 136/135 S

[56] References Cited
UNITED STATES PATENTS
1,611,519  12/1926  Franklin ........................... 136/170
2,111,347  3/1938  Wheat ........................... 136/170 UX
2,718,540  9/1955  Betz ............................... 136/181 X
3,605,065  9/1971  Shannon ........................ 136/135 X Primary Examiner—Anthony Skapars
Attorney—W. S. Pettigrew et al.

[57] ABSTRACT

A storage battery including attached terminal cables having sleeve connectors on their distal ends. When not in use, the cables lie in a hollow in the battery's cover. When the distal ends of the cables are appropriately fixed to the cover, the cables function as a carrying handle. After installation in a vehicle, the distal ends are released and free to move in any direction as the situation requires.

3 Claims, 6 Drawing Figures

STORAGE BATTERY HAVING INTEGRAL CABLES EXTENDING THE BATTERY'S TERMINALS

BACKGROUND OF THE INVENTION

This invention relates to storage batteries and primarily lead-acid batteries destined for the automobile battery replacement market. Modern vehicles, with their larger engines and numerous accessories, are faced with an engine compartment space crisis, and the available under-the-hood space for battery placement is diminishing. As a result, ofttimes the battery is placed in such inconvenient locations as under a fender or other overhanging obstruction. One manufacturer reduces some of this inconvenience by offering a battery having its terminals on the sides of the battery which permits placement of the battery under overhanging obstructions or the like without loss of acessibility to the terminals. Moreover, connectors on conventional battery cables supplied with a vehicle tend to corrode frequently necessitating removal and replacement of the original equipment connector at about the time the battery itself is replaced. Removal of the connector, as by cutting, frequently shortens the cable sufficiently that it can no longer reach the battery's terminals. When this occurs, a completely new cable assembly must be purchased. Lastly, replacement batteries are frequently handled by a number of people, e.g., the manufacturer, the distributor, the seller, the ultimate purchaser and finally the installer.

SUMMARY OF THE INVENTION

It is an object of this invention to provide a universal replacement battery which is particularly adaptable to the varied situations and problems that arise in conjunction with automobile battery replacements particularly as those situations relate to convenient handling, placement and connection of the battery. This and other objects and advantages of this invention will become more apparent from the detailed description which follows.

The battery which is the subject of this invention is one having integral cables which effectively extend the battery's terminals to make them more accessible, as well as providing means for easily toting the battery. The terminal cables each have one end permanently affixed to the opposite polarity terminals of the battery and another freely moveable distal end having a universal connector thereon. Prior to positioning in a vehicle, the connector on the distal end engages the battery cover in a way which temporarily anchors the otherwise loose connector thereto for carrying purposes. After placement in a vehicle requiring readily accessible battery terminals for hook-up, the connectors on the distal ends are readily disengaged from the cover and the cables moved in any desired manner to connect to the vehicle's electrical system. The connectors on the distal ends are adapted for speedy connection with the existing cables supplied with the vehicle. In a preferred embodiment, this is accomplished by merely cutting off the old cable connector, exposing a length of cable wire and inserting the exposed wire into a connector sleeve, or the like, on the distal ends of the terminal-cables. This eliminates the need for a terminal adaptor to join incompatible terminals and connectors as well as eliminates the need for replacing the vehicle's original equipment cables when shortening results from original equipment connector corrosion. On the shelf, the terminal cables are conveniently folded into a hollow formed in the cover of the battery and, in a most preferred embodiment, the hollow is bordered by a venting manifold system formed integrally with the cover.

DETAILED DESCRIPTION OF A PREFERRED EMBODIMENT

Figure 1:
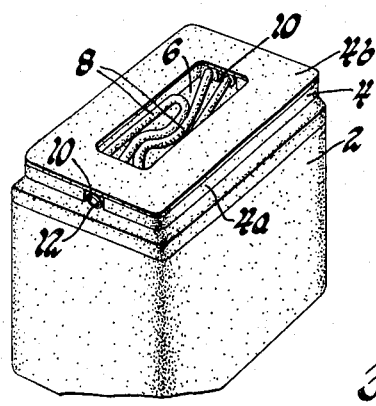
FIGS. 1, 2 and 3 respectively depict the storing, toting and utilization modes of this battery.
Figure 2:
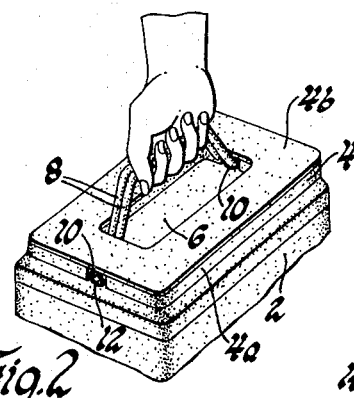
Figure 5:
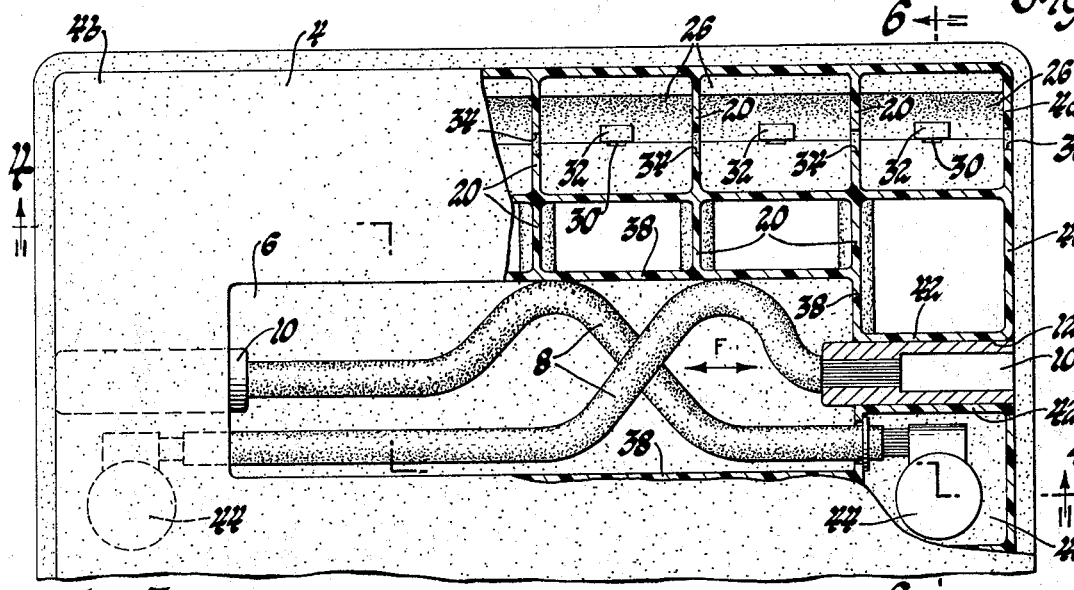
FIG. 5 is a partially sectioned, plan view of one cover design incorporating the features of this invention.
Figure 6:
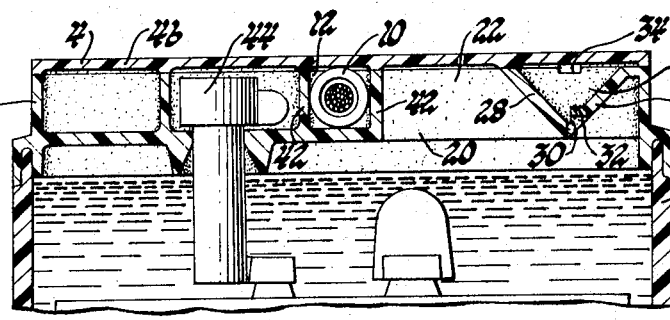
FIG. 6 is a partially sectioned, side elevational view taken along line 6—6 of FIG. 5.

In the figures, there is shown a battery case 2 having a two-piece cover 4 comprising a primary cover 4a and secondary cover or closure 4b for the primary cover 4a. The cover 4 has a hollow 6 in its center and terminal-cables 8 in the hollow 6. The terminal-cables 8 are permanently connected and anchored at one end to the opposite polarity terminals 44 of the battery and have sleeve-like terminal connectors 10 on the distal ends thereof. In one embodiment, i.e., shown in FIG. 1, the terminal-cables 8 are folded back on themselves in a hairpin-like fashion and the connectors 10 of each terminal-cable 8 engages the cover 4 on the same side of the battery as its anchored end. In another embodiment, i.e., shown in FIG. 5, the terminal-cable 8 cross over each other and the terminal-connectors 10 each engage the cover 4 on the opposite side of the battery from its anchored end. In the storage and toting modes, FIGS. 1 and 2 respectively, the connectors 10 are held in place by an appropriate retaining means. In the toting mode this retaining means must have sufficient holding power to prevent the terminal-connector 10 from coming loose under the weight of the battery. A preferred retaining means is a receptacle or channel 12 formed in a portion of the cover 4 surrounding the hollow 6. In this regard, the hollow 6 is defined by an inner wall 38 formed on the upper surface of the primary cover 4a. An outer wall 40 surrounds the inner wall 38. The inner wall 38 and outer wall 40 define a utility region between them which is partitioned into a number of segments. The utility region between the walls contains such vital functionaries as (1) the joint between the terminal-cable and the cells' terminals, (2) the terminal-connector retainer and (3) the cells' venting system. In this regard, one segment is a chamber 46 which surrounds the joint between the terminal-cable 8 and the terminal 44 and is filled with an appropriate sealing compound (not shown), such as epoxy resin, for protecting the junction from corrosion and for permanently anchoring the end of cable 8 to the battery cover 4. Still another segment is the channel 12 which extends between the walls 38 and 40 and is defined on its sides by the transverse partitions 42. The inside dimensions of the channel 12 closely approximate the outside dimensions of the terminal-connector 10 such that when the secondary cover 4b is in place the connector 10 can readily be slid in and out of the channel 12 when force (F) is applied axially to the connector 10. On the other hand, when force is applied to the connector 10 from substantially any other direction, i.e., normal to the cover, such as occurs when using the cables 8 as tote handles (FIG. 2), the connectors 10 jam or bind in the channel 12 and movement of the connector 10 out of the channel 12 is prevented. Connector outside diameters of about nine-sixteenths inch and inside channel dimensions of about five-eighths inch between partitions 42 are preferred. Still other segments, formed by partitions 20 in the utility region, provide individual vent and splash zones 22 over each cell 24 and include wedge-shaped vent wells 26 joined together to form a vent duct. As best shown in FIG. 6, the vent wells 26 are defined by the depending converging walls 28. Vent ports 30 are at the apex of the wedge permit gases to escape from the cells 24 into the vent wells 26. Molded-in, shelf-like baffles 32 overhang the vent ports 30 and reduce electrolyte splash into the vent wells 26. The several vent wells 26 are intercommunicated by means of apertures 34 in the partitions 20 and an additional aperture 36 is provided in end vent well 26 to vent the several wells to the atmosphere. Still other partitions serve to strengthen and rigidize the molded primary cover 4a and provide sites for bonding the closure 4b to the primary cover 4a using conventional sealing techniques, e.g., heat sealing.

Figure 3:
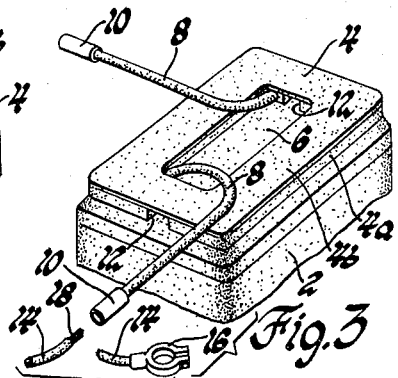
Figure 4:
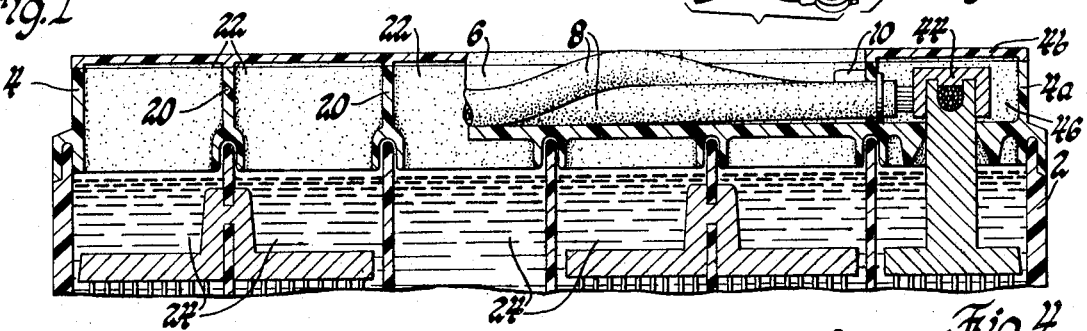
FIG. 4 is a sectioned, side elevational view taken along the line 4—4 of FIG. 5.

FIG. 3 depicts the freedom that the cables 8 have, once the connectors 10 are freed from the channels 12. In some circumstances, there is no need to free the connectors 10. Rather connection can be made to the connectors 10 while they are still in the channels 12. In any event, connection is conveniently made by cutting off the connector 16 from the original equipment battery cable 14. Its conductor 18 is bared by stripping away the insulation and then merely inserted into the sleeve-like connector 10 where it is firmly fixed in place in any convenient manner such as soldering, clamping, set screwing, etc. The length of the cables 8 is limited only by two considerations, the first being that there be sufficient length to permit convenient grasping without discomfort while carrying and, yet sufficiently short to permit folding into the hollow 6. For most applications cable lengths (including connector 10) of about eight and one-half inches are preferred.

The connector 10 may comprise any of a number of conductive materials, though lead and its alloys are preferred for corrosion resistance reasons. Likewise, though not shown in the drawings, the connector 10 may conveniently be coated with an acid resistant layer of plastic such as polypropylene, polyvinylchloride, etc.

While we have disclosed our invention solely in terms of certain specific embodiments thereof, we do not intend it to be limited thereto, but rather only to the extent hereinafter set forth in the claims which follow.

We claim:

1. A storage battery comprising: A container having interconnected electrochemical cells therein which end in a pair of opposite polarity terminals; said container including a cover having wall means defining a hollow in the cover; terminal-cables having anchored ends affixed to said terminals and moveable distal ends, said cables being adapted for folding into said hollow when not in use; terminal-connectors on said distal ends adapted to engage input means to the electrical system of a vehicle; and retainers on the container snugly engaging the terminal-connectors and restricting movement thereof out of the retainers when one force is applied to the terminal-connectors from a first predetermined direction and releasing the terminal-connectors when another force is applied to the terminal-connectors from a second predetermined direction; whereby said cables can function as carrying handles for the battery while the terminal-connectors engage the retainers and the applied force is from said first predetermined direction yet have their distal ends readily available for movement in any direction after said one force is removed and said another force is applied.

2. A storage battery comprising: A container having interconnected electrochemical cells therein which end in a pair of opposite polarity terminals; a cover on the container; closure means on the cover; said cover including a first outer wall near the periphery of the cover and a second wall inwardly of the first wall defining a hollow in the cover; a utility region defined substantially by said walls and including a plurality of partitions dividing the region into a plurality of segments; a number of said segments being aligned and including vent wells; apertures in the partitions dividing the aligned segments with the vent wells to intercommunicate the several vent wells and thereby form a vent duct; means venting said duct to the atmosphere; a pair of terminal-cables in said hollow each having a first end permanently anchored to one of the cells' opposite polarity terminals and a second freely moveable distal end; connector means on said distal end adapted for connection to the electrical system of a vehicle; retainer means in said utility region which means snugly engages the connector means and restricts movement thereof out of the retainer means when force is applied to an end of the connector means from a direction substantially normal to the cover and releases the connector means when force is applied to the connector in a predetermined direction other than said normal direction; whereby said cables can function as carrying handles while the connectors engage the retaining means yet, on demand, have their distal ends readily removeable from said retainer means and freely moveable in any direction.

3. A storage battery comprising: A container having interconnected electrochemical cells therein which end in a pair of opposite polarity terminals; said container including a cover and a closure means on the cover; said cover including a first outer wall near the periphery of the cover and a second wall inwardly of the first wall defining a hollow in the cover; a utility region defined substantially by said walls and including a plurality of partitions dividing the region into a plurality of segments; a number of said segments being aligned and including vent wells; apertures in the partitions dividing the aligned segments with the vent wells to intercommunicate the several vent wells and thereby form a vent duct; means venting said vent duct to the atmosphere; a pair of terminal-cables in said hollow each having a first end permanently anchored to one of the cell's opposite polarity terminals and a second freely moveable distal end; sleeve-like connector means on said distal end adapted for connection to the electrical system of a vehicle and having a predetermined outside dimension; retainer means including a receptacle in said utility region and beneath said closure, said receptacle having a shape compatible with said connector means and an inside dimension no less than said predetermined outside dimension and such that said connector will readily slip into and out of said receptacle when force is applied in the direction of the principal axis of the connector but will jam in said receptacle when force is applied to said connector in a direction normal to the cover; whereby said cables can function as carrying handles while the connectors are in said receptacle yet, on demand, have their distal ends readily removeable from the receptacle and freely moveable in any direction.

* * * * *